US012436495B2

(12) United States Patent
Goin et al.

(10) Patent No.: US 12,436,495 B2
(45) Date of Patent: Oct. 7, 2025

(54) NIP SEPARATOR FOR SEPARATING ROLLERS IN AN IMAGE FORMING DEVICE

(71) Applicant: LEXMARK INTERNATIONAL, INC., Lexington, KY (US)

(72) Inventors: Richard Louis Goin, Lexington, KY (US); Bartley Charles Gould, II, Lexington, KY (US); Virgil Johnson, Jr., Versailles, KY (US); Leah Kaitlin Pettit, Berea, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 18/741,255

(22) Filed: Jun. 12, 2024

(65) Prior Publication Data

US 2025/0068095 A1 Feb. 27, 2025

Related U.S. Application Data

(60) Provisional application No. 63/533,748, filed on Aug. 21, 2023.

(51) Int. Cl.

| | |
|---|---|
| ***G03G 21/18*** | (2006.01) |
| ***G03G 15/00*** | (2006.01) |
| ***G03G 15/01*** | (2006.01) |
| ***G03G 15/08*** | (2006.01) |
| ***G03G 21/16*** | (2006.01) |

(52) U.S. Cl.

CPC ..... *G03G 21/1821* (2013.01); *G03G 15/0121* (2013.01); *G03G 15/0808* (2013.01); *G03G 15/0813* (2013.01); *G03G 15/0818* (2013.01); *G03G 15/0896* (2013.01); *G03G 15/757* (2013.01); *G03G 21/1647* (2013.01); *G03G 21/1676* (2013.01)

(58) Field of Classification Search

CPC ........... G03G 15/0121; G03G 15/0808; G03G 15/0813; G03G 15/0818; G03G 15/0896; G03G 15/757; G03G 21/1647; G03G 21/1676; G03G 21/1821

See application file for complete search history.

(56) References Cited

U.S. PATENT DOCUMENTS 6,385,420 B1 * 5/2002 Morioka ............ G03G 21/1814 399/176
8,210,530 B1 7/2012 Gayne et al.
(Continued)

*Primary Examiner* — Joseph S Wong

(57) ABSTRACT

A nip separator for use in an image forming device includes a retainer configured to retain the nip separator on a first rotatable component with the nip separator being manually installable on the first rotatable component and rotatable about a rotational axis of the first rotatable component independent of the first rotatable component. An arm extends from the retainer to contact a second rotatable component to maintain separation between surfaces of the first and second rotatable components when the nip separator is in an engaged position. The nip separator is rotatable about the rotational axis from the engaged position to a disengaged position by contact between the arm and the second rotatable component upon rotation of the second rotatable component in an operative rotational direction thereof to permit continued operative contact between the surfaces of the first and second rotatable components when the nip separator is in the disengaged position.

19 Claims, 7 Drawing Sheets

(56) References Cited

U.S. PATENT DOCUMENTS

| | | | |
|---|---|---|---|
| 8,301,057 | B2 | 10/2012 | Agnissey et al. |
| 8,348,273 | B2 | 1/2013 | Gayne et al. |
| 10,663,886 | B2 * | 5/2020 | Toba .................. G03G 15/0812 |
| 11,347,180 | B2 | 5/2022 | Cavill et al. |
| 2007/0138732 | A1 | 6/2007 | Hackney |
| 2016/0077485 | A1 | 3/2016 | Sproul |
| 2025/0013192 | A1 * | 1/2025 | Koishi .................. G03G 21/16 |

* cited by examiner

NIP SEPARATOR FOR SEPARATING ROLLERS IN AN IMAGE FORMING DEVICE

CROSS REFERENCES TO RELATED APPLICATIONS

This application claims priority to U.S. Provisional Patent Application Ser. No. 63/533,748, filed Aug. 21, 2023, entitled "Nip Separator For a Roll Assembly," the content of which is hereby incorporated by reference in its entirety.

BACKGROUND

1. Field of the Disclosure

The present disclosure relates generally to image forming devices and more particularly to a nip separator for separating rollers in an image forming device.

2. Description of the Related Art

During the electrophotographic printing process, an electrically charged rotating photoconductive drum is selectively exposed to a laser beam. The areas of the photoconductive drum exposed to the laser beam are discharged, creating an electrostatic latent image of a page to be printed on the photoconductive drum. Toner particles from a developer roll are then electrostatically transferred to the latent image on the photoconductive drum, creating a toned image on the drum. The toned image is transferred to the print media (e.g., paper) either directly by the photoconductive drum or indirectly by an intermediate transfer member. The toner is then fused to the media using heat and pressure to complete the print.

Generally, in the case of a single component development system, the developer roll contacts the photoconductive drum during the printing process. However, when the image forming device is not in use, such as during shipping or storage, it is desirable to separate the developer roll and the photoconductive drum from each other. Otherwise, toner may embed on the outer surface of the photoconductive drum from micro vibration between the outer surfaces of the developer roll and the photoconductive drum during shipment. In other cases, the developer roll and/or photoconductive drum may chemically degrade when maintained in stationary contact against each other for long periods of time, especially at higher temperature and humidity conditions. In some cases, where one roll is softer than another roll, the softer roll may develop flat spots over time when maintained in stationary contact with the harder roll. These deformities may, in turn, cause print defects.

As a result, an apparatus that separates various rolls of an image forming device, such as the developer roll and the photoconductive drum, is desired.

SUMMARY

A nip separator for use in an image forming device according to one example embodiment includes a retainer configured to retain the nip separator on a first rotatable component of the image forming device during operation of the image forming device with the nip separator rotatable about a rotational axis of the first rotatable component independent of the first rotatable component. The nip separator is manually installable on the first rotatable component. An arm extends from the retainer to contact a second rotatable component of the image forming device to maintain separation between surfaces of the first rotatable component and the second rotatable component when the nip separator is in an engaged position. The nip separator is rotatable about the rotational axis of the first rotatable component from the engaged position to a disengaged position by contact between the arm and the second rotatable component upon rotation of the second rotatable component in an operative rotational direction of the second rotatable component to permit continued operative contact between the surfaces of the first rotatable component and the second rotatable component when the nip separator is in the disengaged position. In one embodiment, the nip separator is manually installable on the first rotatable component by snap-fit engagement.

Embodiments include those wherein the arm includes a first portion and a second portion extending from the first portion. The first portion of the arm is configured to contact the second rotatable component when the nip separator is in the engaged position. The second portion of the arm is configured to contact the second rotatable component when the nip separator rotates from the engaged position towards the disengaged position. In one embodiment, the second portion of the arm is deflectable towards the rotational axis of the first rotatable component by contact between the second portion of the arm and the second rotatable component when the nip separator rotates from the engaged position towards the disengaged position. In another embodiment, the second portion of the arm extends from the first portion of the arm in a cantilevered manner.

In some embodiments, the retainer is configured to retain the nip separator on a spacer ring positioned at an end portion of the first rotatable component during operation of the image forming device. In one embodiment, the retainer includes a retaining ring having an arcuate profile.

A nip separator for use in an image forming device according to another example embodiment includes a retaining ring for retaining the nip separator on a first rotatable component of the image forming device during operation of the image forming device with the nip separator rotatable about a rotational axis of the first rotatable component independent of the first rotatable component, and an arm having a first portion extending radially relative to the rotational axis of the first rotatable component from the retaining ring. A deflectable second portion of the arm extends from a distal end of the first portion of the arm at an angle to the first portion of the arm. A contact surface is formed by the first and second portions of the arm to contact a second rotatable component of the image forming device to maintain separation between an outer surface of the first rotatable component and an outer surface of the second rotatable component when the nip separator is in an engaged position. The nip separator is rotatable relative to the rotational axis of the first rotatable component from the engaged position to a disengaged position by contact between the contact surface of the arm and the outer surface of the second rotatable component upon rotation of the second rotatable component in an operative rotational direction of the second rotatable component to permit continued contact between the outer surface of the first rotatable component and the outer surface of the second rotatable component when the nip separator is in the disengaged position. Deflection of the second portion of the arm toward the rotational axis of the first rotatable component permits a gap between the outer surface of the first rotatable component and the outer surface of the second rotatable component to decrease during rotation of the nip separator from the engaged position to the disengaged position.

Embodiments include those wherein the retaining ring includes an arcuate profile having an open end such that the nip separator is manually installable on the first rotatable component by snap-fit engagement. In one embodiment, the second portion of the arm extends from the distal end of the first portion of the arm in a cantilevered manner. In another embodiment, the contact surface formed by the first portion of the arm includes a first segment and a second segment that is recessed relative to the first segment. In another embodiment, the second portion of the arm extends from the second segment of the contact surface formed by the first portion of the arm. In some embodiments, the retaining ring is configured to retain the nip separator on a spacer ring positioned at an end portion of the first rotatable component during operation of the image forming device.

An assembly for an image forming device according to one example embodiment includes a first rotatable component, a second rotatable component, a first separator positioned at a first end portion of the first rotatable component and a second separator positioned at a second end portion of the first rotatable component. Each of the first separator and the second separator is manually installable onto and detachable from the first rotatable component. Each of the first separator and the second separator is movable relative to the first and second rotatable components between an engaged position and a disengaged position. In the engaged position, the first and second separators separate surfaces of the first rotatable component and the second rotatable component. The first and second separators are movable from the engaged position to the disengaged position upon rotation of the second rotatable component in an operative rotational direction of the second rotatable component by contact between the first and second separators and the second rotational component permitting continued operative contact between the surfaces of the first rotatable component and the second rotatable component when the nip separator is in the disengaged position. In one embodiment, the first and second separators are manually installable onto and detachable from the first rotatable component by snap-fit engagement and disengagement.

Embodiments include those wherein the first end portion of the first rotatable component includes a first spacer ring and the second end portion of the first rotatable component includes a second spacer ring with the first separator positioned on the first spacer ring and the second separator positioned on the second spacer ring. In one embodiment, the first and second separators are rotatable about the first and second spacer rings independent of the first and second spacer rings, respectively. In another embodiment, the first and second separators separate surfaces of the spacer ring and the second rotatable component when in the engaged position.

In one embodiment, the first rotatable component includes a developer roll and the second rotatable component includes a photoconductive drum.

BRIEF DESCRIPTION OF THE DRAWINGS

The accompanying drawings incorporated in and forming a part of the specification, illustrate several aspects of the present disclosure, and together with the description serve to explain the principles of the present disclosure.

DETAILED DESCRIPTION

In the following description, reference is made to the accompanying drawings where like numerals represent like elements. The embodiments are described in sufficient detail to enable those skilled in the art to practice the present disclosure. It is to be understood that other embodiments may be utilized and that process, electrical, and mechanical changes, etc., may be made without departing from the scope of the present disclosure. Examples merely typify possible variations. Portions and features of some embodiments may be included in or substituted for those of others. The following description, therefore, is not to be taken in a limiting sense, and the scope of the present disclosure is defined only by the appended claims and their equivalents.

Figure 1:
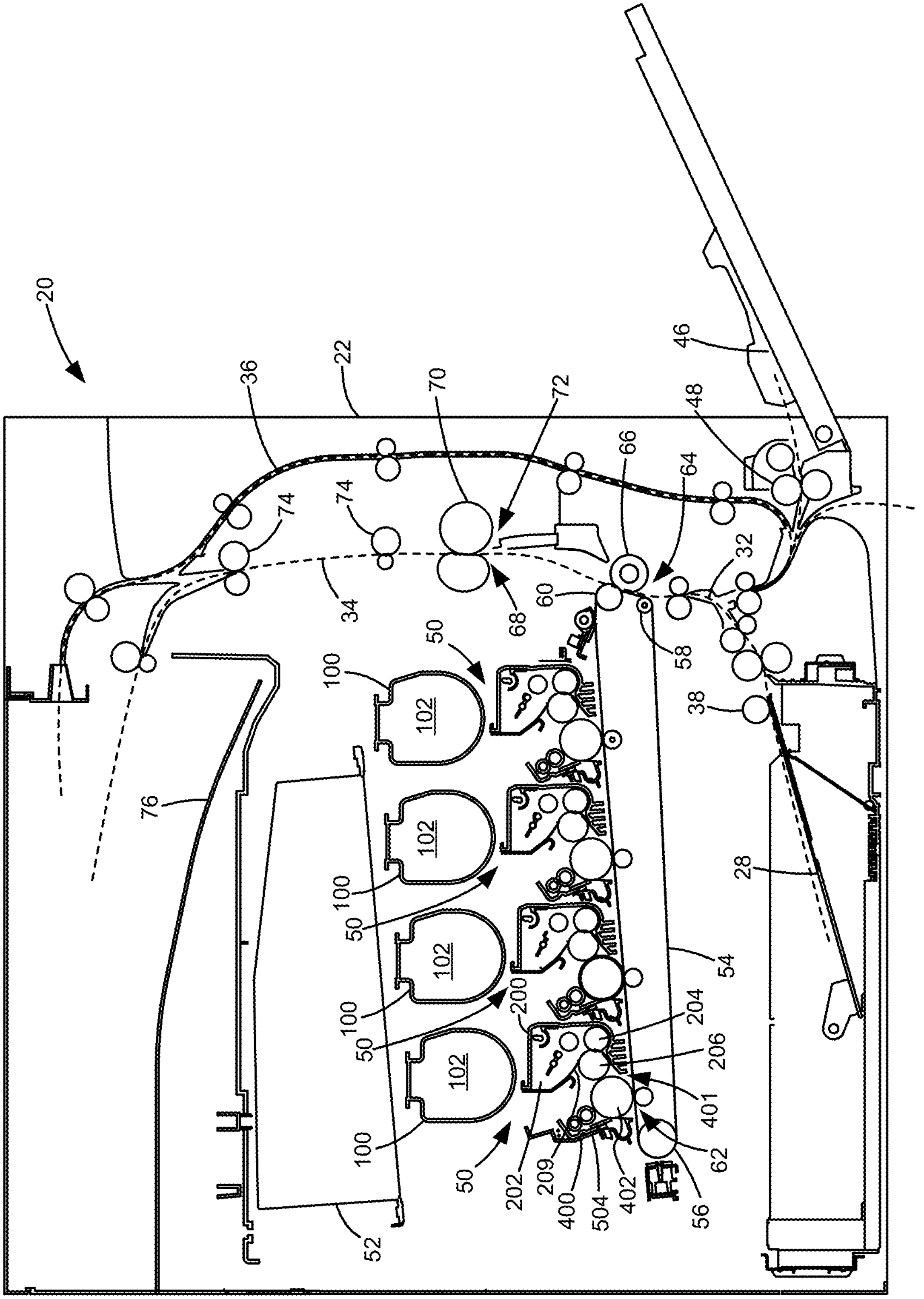
FIG. 1 is a schematic view of an image forming device according to one example embodiment.

FIG. 1 illustrates a schematic view of the interior of an example image forming device 20. Image forming device 20 includes a housing 22. Housing 22 includes one or more input trays 28 positioned therein. Each tray 28 is sized to contain a stack of media sheets. As used herein, the term media is meant to encompass not only paper but also labels, envelopes, fabrics, photographic paper and any other desired substrate. Trays 28 are preferably removable for refilling. A control panel may be located on housing 22. Using the control panel, a user is able to enter commands and generally control the operation of image forming device 20. For example, a user may enter commands to switch modes (e.g., color mode, monochrome mode), view the number of images printed, etc. A media path 32 extends through image forming device 20 for moving the media sheets through the image transfer process. Media path 32 includes a simplex path 34 and may include a duplex path 36. A media sheet is introduced into simplex path 34 from tray 28 by a pick mechanism 38. In the example embodiment shown, pick mechanism 38 includes a roll positioned to move the media sheet from tray 28 and into media path 32. The media sheet is then moved along media path 32 by various transport rollers. Media sheets may also be introduced into media path 32 by a manual feed 46 having one or more rolls 48 or by additional media trays.

Image forming device 20 includes an image transfer section that includes one or more imaging stations 50. Each imaging station 50 includes a toner cartridge 100, a developer unit 200 and a photoconductor unit (PC unit) 400. Each toner cartridge 100 includes a reservoir 102 for holding toner and an outlet port in communication with an inlet port of a corresponding developer unit 200 for transferring toner from reservoir 102 to developer unit 200. In the example embodiment illustrated, developer unit 200 utilizes what is commonly referred to as a single component development system. In this embodiment, each developer unit 200 includes a toner reservoir 202 and a toner adder roll 204 that moves toner from reservoir 202 to a developer roll 206. Each PC unit 400 includes a charging roll 504 and a photoconductive (PC) drum 402 for each imaging station 50. PC drums 402 are mounted substantially parallel to each other. For purposes of clarity, developer unit 200 and PC unit 400 are labeled on only one of the imaging stations 50 in FIG. 1. In the example embodiment illustrated, each imaging station 50 is substantially the same except for the color or type of toner contained therein.

Each charging roll 504 forms a nip with the corresponding PC drum 402. During a print operation, charging roll 504 charges the outer surface of PC drum 402 to a specified voltage. A laser beam from a printhead 52 associated with each imaging station 50 is then directed to the outer surface of PC drum 402 and selectively discharges those areas it contacts to form a latent image. Developer roll 206 then transfers toner to PC drum 402 to form a toner image. A metering device, such as a doctor blade 209, may be used to meter toner on the outer surface of developer roll 206 and apply a desired charge to the toner prior to its transfer to PC drum 402. Toner on developer roll 206, which forms a nip 401 with PC drum 402, is attracted to the areas of the outer surface of PC drum 402 discharged by the laser beam from printhead 52.

In the example embodiment illustrated, an intermediate transfer mechanism (ITM) 54 is disposed adjacent to imaging stations 50. In this embodiment. ITM 54 is formed as an endless belt trained about a drive roll 56, a tension roll 58 and a back-up roll 60. During print operations, ITM 54 moves past imaging stations 50 in a counterclockwise direction as viewed in FIG. 1. One or more of PC drums 402 apply toner images in their respective colors to ITM 54 at a first transfer nip 62. ITM 54 rotates and collects the one or more toner images from imaging stations 50 and then conveys the toner images to a media sheet advancing through simplex path 34 at a second transfer nip 64 formed between a transfer roll 66 and ITM 54, which is supported by back-up roll 60. In other embodiments, the toner image is transferred to the media sheet directly by the PC drum(s) 402.

The media sheet with the toner image is then moved along the media path 32 and into a fuser area 68. Fuser area 68 includes fusing rolls or belts 70 that form a nip 72 to adhere the toner image to the media sheet. The fused media sheet then passes through transport rolls 74 located downstream from fuser area 68, which move the media sheet to an output area 76 of image forming device 20 or to duplex path 36 for image formation on a second side of the media sheet, as desired.

A monocolor image forming device 20 may include a single imaging station 50, as compared to a color image forming device 20, which may include multiple imaging stations 50.

Figure 2:
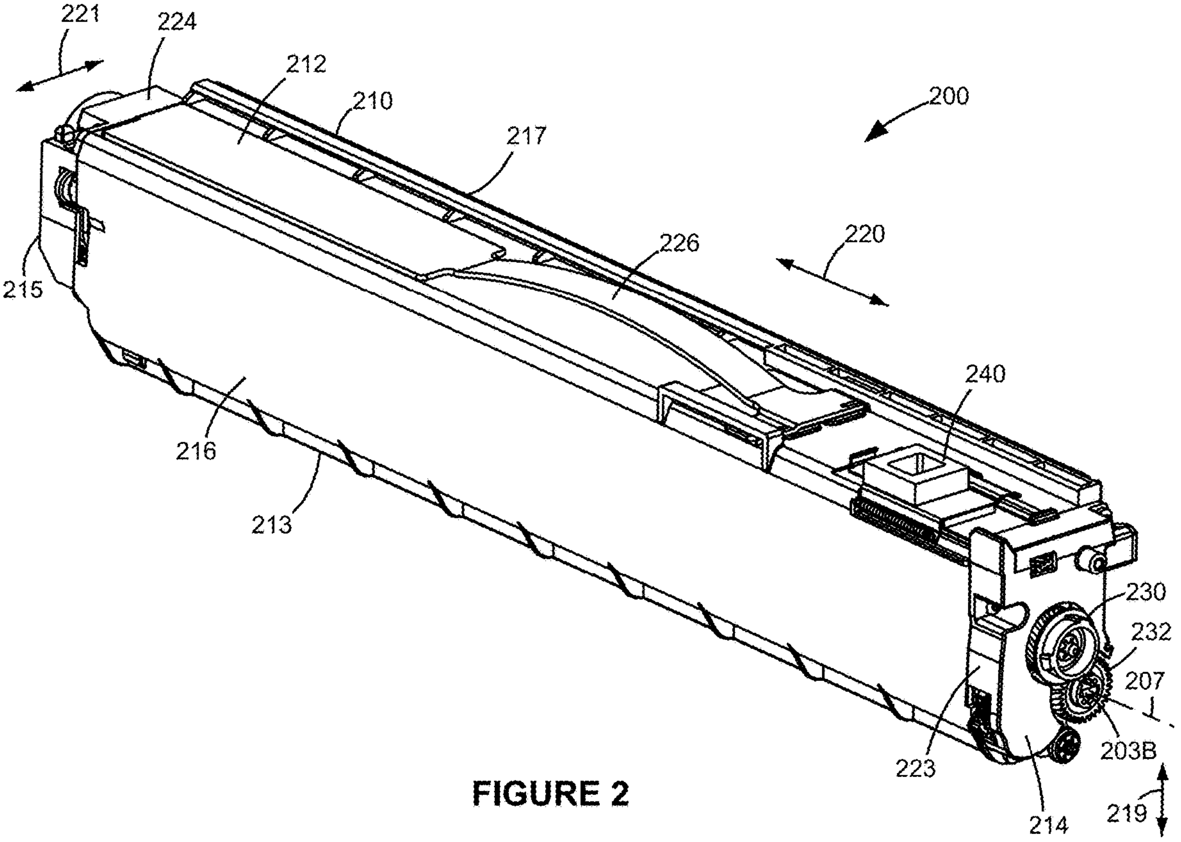
FIGS. 2 and 3 are perspective views of a developer unit according to one example embodiment.
Figure 3:
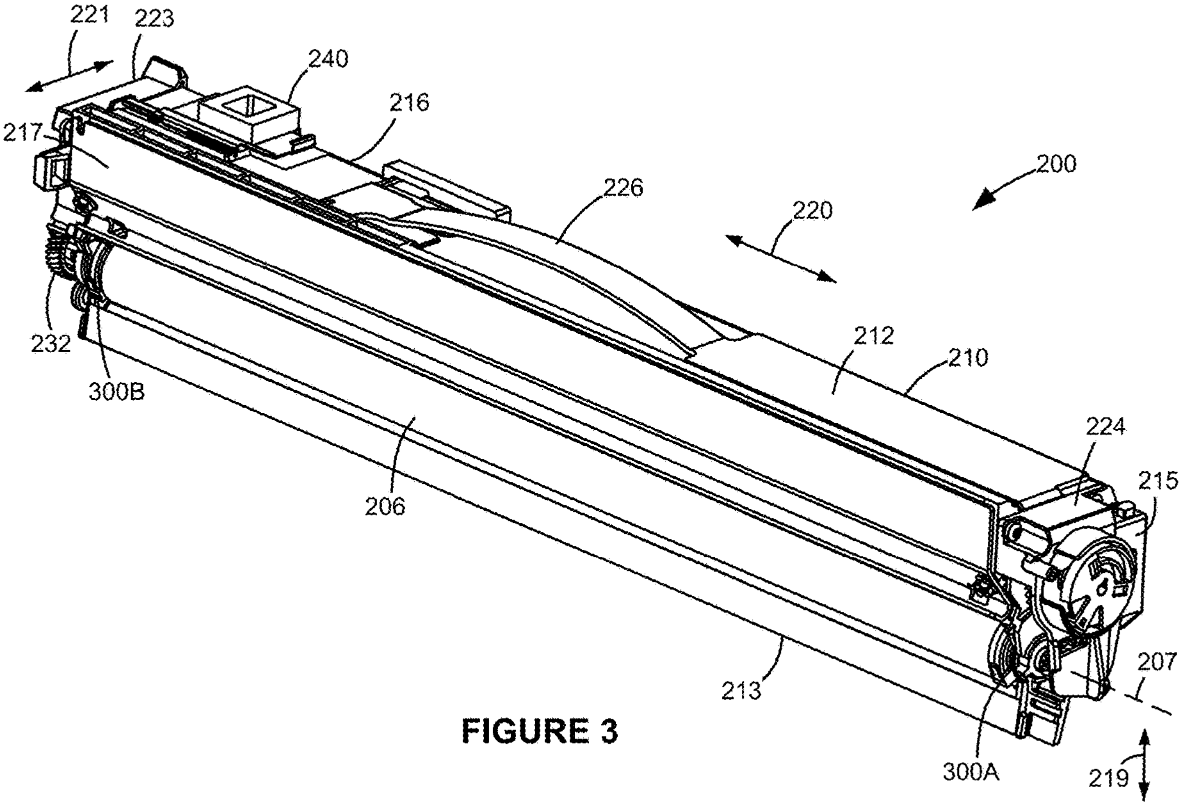

FIGS. 2 and 3 show developer unit 200 according to one example embodiment. Developer unit 200 includes a body 210 housing toner reservoir 202 therein. Body 210 includes a top 212, a bottom 213, a first end 214, a second end 215 and a pair of sides 216, 217. Body 210 has a height measured along a vertical dimension 219 of developer unit 200 between top 212 and bottom 213, a length measured along a longitudinal dimension 220 of developer unit 200 orthogonal to vertical dimension 219 between end 214 and end 215, and a width measured along a side-to-side dimension 221 of developer unit 200 orthogonal to vertical dimension 219 and longitudinal dimension 220 between side 216 and side 217. In the example embodiment illustrated, each end 214, 215 of body 210 includes a respective end cap 223, 224 mounted on a corresponding end wall at each end 214, 215, such as by suitable fasteners (e.g., screws, rivets, etc.) or by a snap-fit engagement. In this embodiment, the end walls at ends 214, 215 along with top 212, bottom 213 and sides 216, 217 form toner reservoir 202. In the example embodiment illustrated, developer unit 200 includes a handle 226 positioned along top 212 of body 210 to assist the user with handling developer unit 200.

In the embodiment illustrated, a drive coupler 230 is exposed on an outer portion of body 210 in position to receive rotational force from a corresponding drive system in image forming device 20 when developer unit 200 is installed in image forming device 20 to drive rotatable components of developer unit 200. The drive system in image forming device 20 may include one or more drive motors and a drive transmission from the drive motor(s) to a drive coupler that mates with drive coupler 230 of developer unit 200 when developer unit 200 is installed in image forming device 20. In the example embodiment illustrated, drive coupler 230 is positioned on end 214 of body 210. In the example embodiment illustrated, drive coupler 230 is configured to mate with and receive rotational motion from the corresponding drive coupler in image forming device 20 at the axial end of drive coupler 230. Drive coupler 230 is operatively connected (either directly or indirectly through one or more intermediate gears) to rotatable components of developer unit 200 including, for example, toner adder roll 204 and developer roll 206, to rotate toner adder roll 204 and developer roll 206 upon receiving rotational force from the corresponding drive system in image forming device 22. In the example embodiment illustrated, a gear 232 operatively connects drive coupler 230 to developer roll 206 such that drive coupler 230 rotates developer roll 206 when drive coupler 230 rotates. Any additional rotatable components of developer unit 200. e.g., one or more toner agitators or augers positioned in toner reservoir 202, if present, may be connected to drive coupler 230 by one or more gears.

Developer unit 200 includes an inlet port 240 positioned to receive toner from an outlet port (not shown) of toner cartridge 100 to replenish reservoir 202 as toner is consumed from reservoir 202 by the printing process. In the example embodiment illustrated, inlet port 240 is positioned on top 212 of body 210 near end 214.

Developer unit 200 includes separator members 300A, 300B (generally designated as separator members 300) positioned at respective ends of developer roll 206 for use in separating an outer surface 208 of developer roll 206 and an outer surface 404 of PC drum 402 from each other in order to open nip 401. For example, developer roll 206 and PC drum 402 may be separated using separator members 300A, 300B such that outer surface 208 of developer roll 206 and outer surface 404 of PC drum 402 do not contact each other prior to actual use of image forming device 20. In the embodiment illustrated, each separator member 300 is rotatable independent of developer roll 206 about a rotational axis 207 of developer roll 206 between an engaged position and a disengaged position relative to PC drum 402. In the engaged position, separator member 300 is configured to engage PC drum 402 so as to cause a gap or space to form between the outer surface 208 of developer roll 206 and outer surface 404 of PC drum 402 such that outer surface 208 of developer roll 206 and outer surface 404 of PC drum 402 are separated from and do not contact each other. In the disengaged position, separator member 300 is configured to permit operative contact between outer surface 208 of developer roll 206 and outer surface 404 of PC drum 402.

Figure 4:
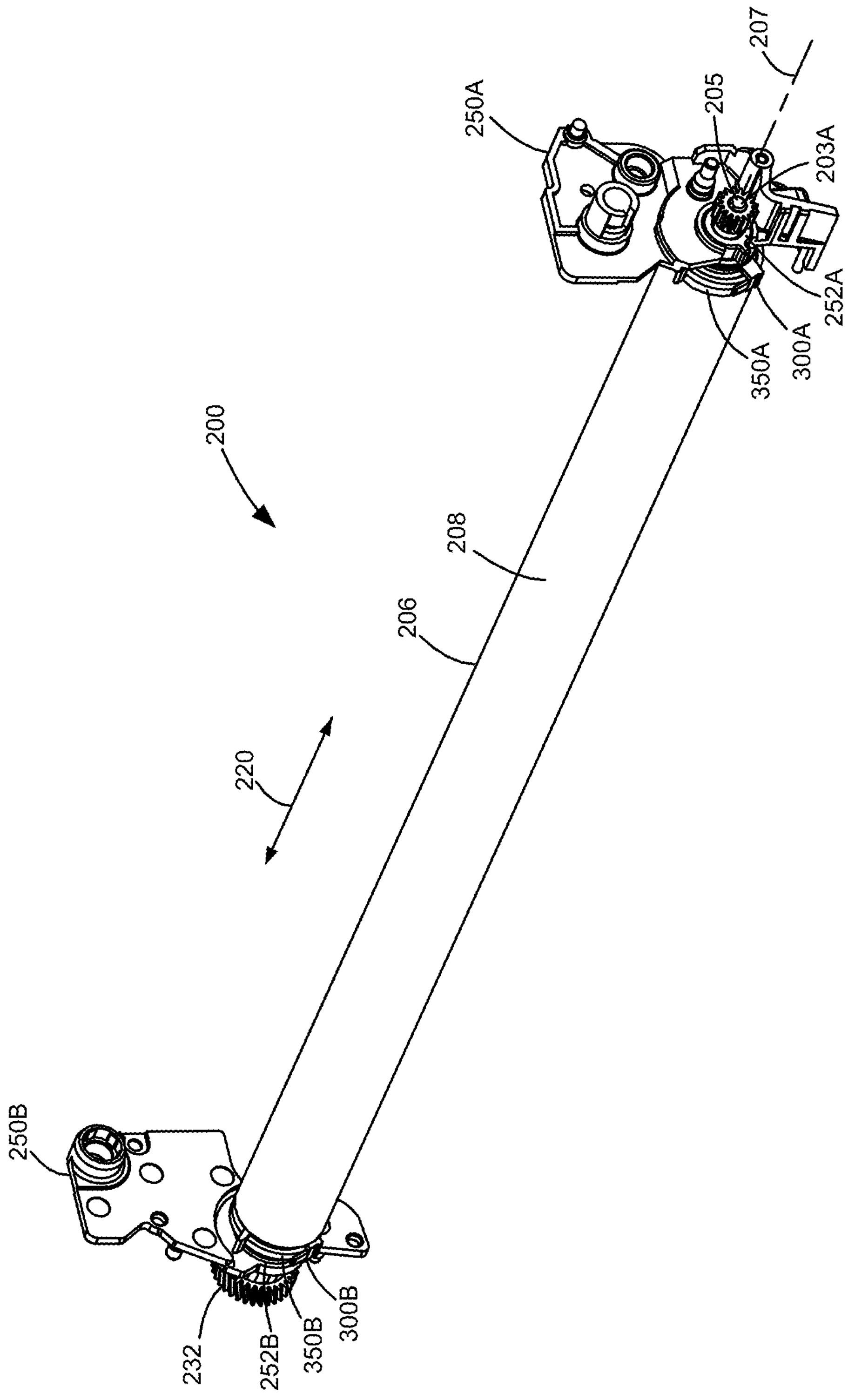
FIG. 4 is a perspective view of a developer roll assembly of the developer unit shown in FIGS. 2 and 3 according to one example embodiment.

FIG. 4 is a perspective view showing a portion of developer unit 200 including developer roll 206 and separator members 300A, 300B. Developer roll 206 has a shaft 205 extending along longitudinal dimension 220. In the embodiment illustrated, developer roll 206 includes an elastomeric roll body formed circumferentially around shaft 205 that forms outer surface 208 of developer roll 206. A first end frame 250A and a second end frame 250B of developer unit 200 rotatably support developer roll 206. Bushings 252A, 252B (generally designated as bushings 252) provided at first and second end frames 250A, 250B, respectively, receive corresponding first axial end 203A and second axial end 203B (see FIG. 3) of shaft 205 to rotatably support developer roll 206. Gear 232 is mounted on shaft 205 at second axial end 203B of shaft 205 such that rotation of gear 232 causes shaft 205 and developer roll 206 to rotate.

Annular spacers 350A, 350B (generally designated as spacers 350) are rotatably positioned at first and second axial ends 203A. 203B of shaft 205 and are rotatable about rotational axis 207 independent of shaft 205. Each spacer 350 is disposed between developer roll 206 and a corresponding bushing 252. In one embodiment, spacers 350 are configured to set a distance between rotational axis 207 of developer roll 206 and outer surface 404 of PC drum 402 when developer roll 206 and PC drum 402 are in their respective operative positions in image forming device 20. For example, spacers 350 are diametrically sized such that spacers 350 may contact outer surface 404 of PC drum 402 to establish a fixed distance between rotational axis 207 of developer roll 206 and outer surface 404 of PC drum 402 during normal printing operation of image forming device 20. In this manner, spacers 350 define an amount of interference between outer surface 208 of developer roll 206 and outer surface 404 of PC drum 402, and therefore an amount of compression of the elastomeric roll body of developer roll 206, and the nip force between outer surface 208 of developer roll 206 and outer surface 404 of PC drum 402. In this embodiment, spacers 350 are positioned axially outside of the print area so as not to interfere with the transfer of toner from developer roll 206 to PC drum 402.

Separator members 300 are rotatably mounted on shaft 205 independent of shaft 205 such that separator members 300 are free to rotate about rotational axis 207 independent of shaft 205. In one embodiment, each spacer 350 supports and axially positions a corresponding separator member 300 along shaft 205. In the example embodiment illustrated, each separator member 300 is rotatably assembled onto a corresponding spacer 350 such that separator member 300 is rotatable about rotational axis 207 independent of spacer 350.

Figure 5A:
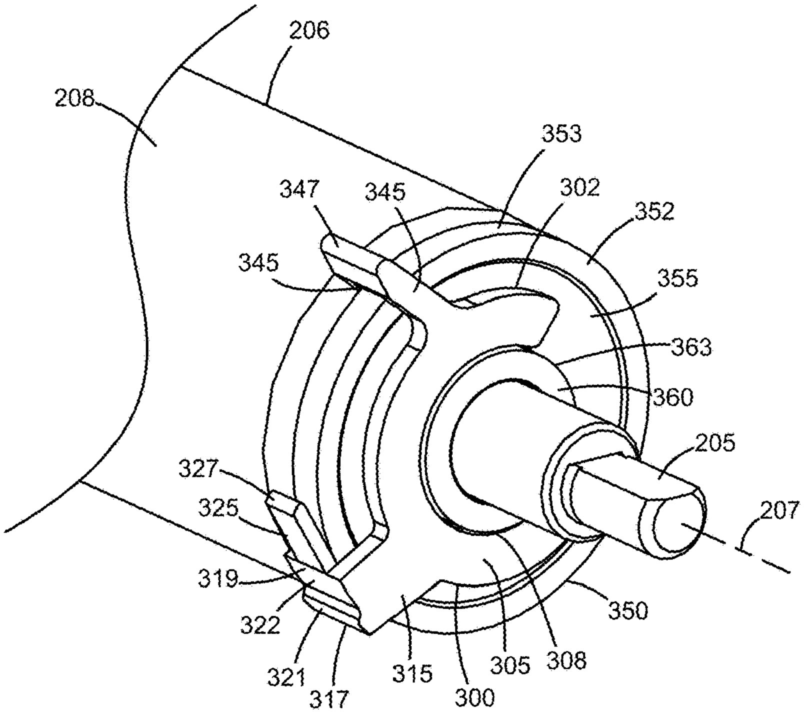
FIGS. 5A and 5B are perspective views showing a portion of the developer roll assembly shown in FIG. 4 with a separator member in an engaged position and a disengaged position, respectively, according to one example embodiment.
Figure 5B:
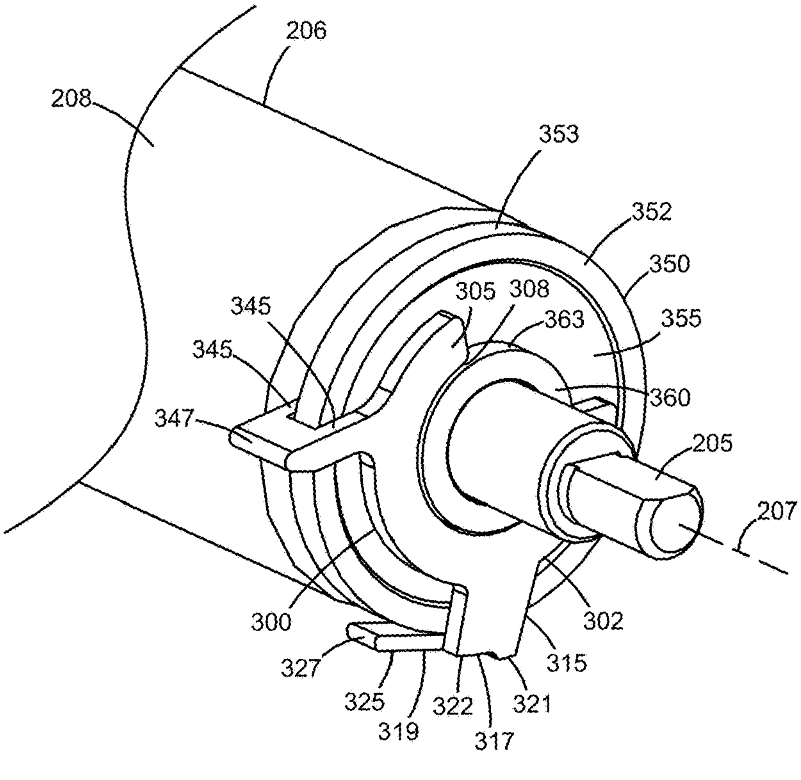
Figure 6A:
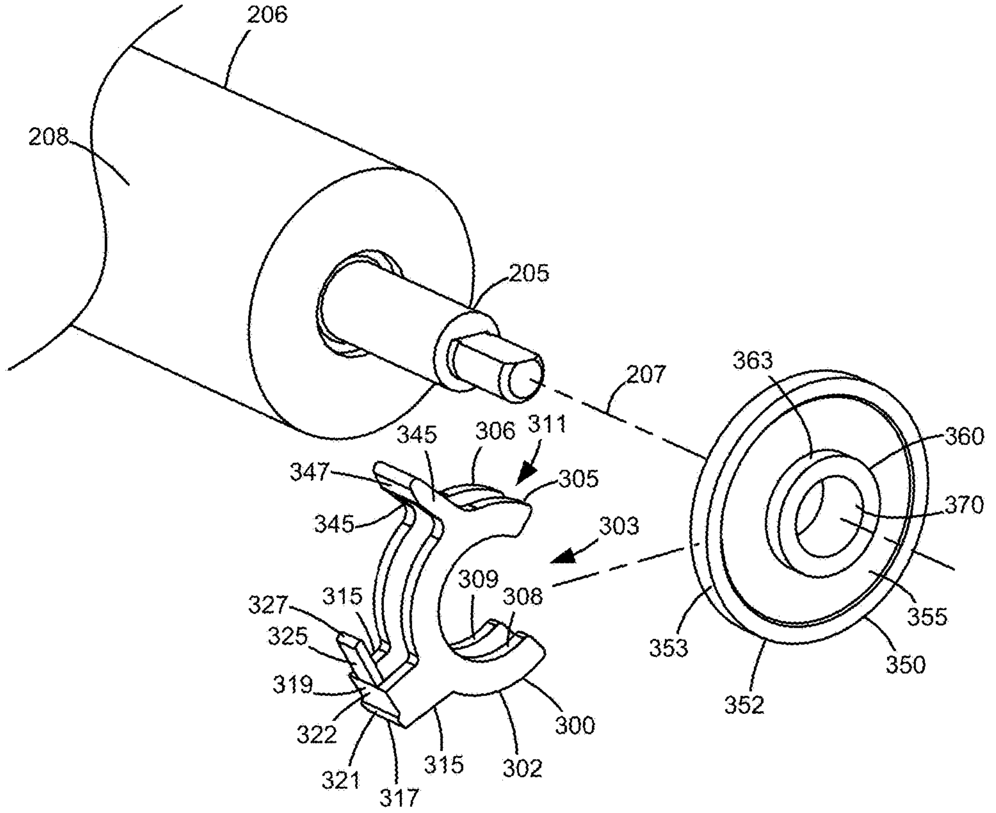
FIGS. 6A and 6B are exploded perspective views of the assembly shown in FIG. 5A.
Figure 6B:
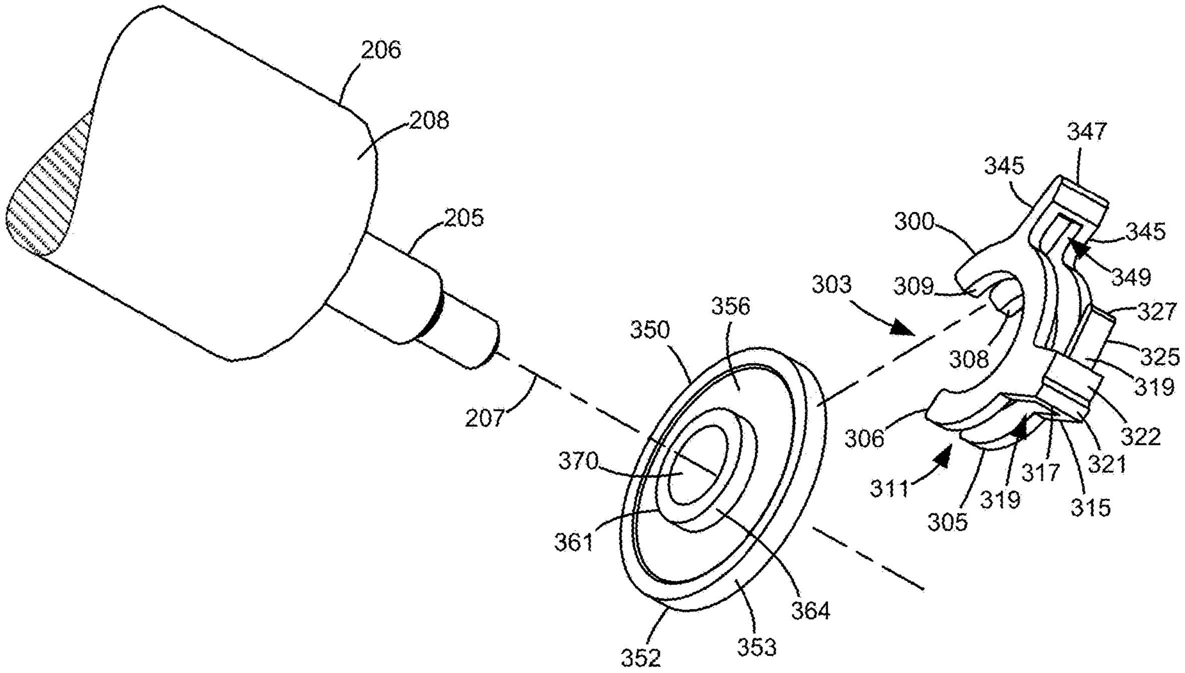

FIGS. 5A and 5B are perspective views showing a longitudinal end portion of developer roll 206 including separator member 300 and spacer 350. FIGS. 6A and 6B are exploded views of the assembly shown in FIG. 5A. Because both separator members 300A, 300B operate in the same manner, only one separator member 300 and corresponding spacer 350 are illustrated in FIGS. 5A-6B.

Separator member 300 is rotatably mounted on spacer 350 and is rotatable about rotational axis 207 independent of spacer 350 between the engaged position shown in FIG. 5A and the disengaged position shown in FIG. 5B. In the embodiment illustrated, spacer 350 is shown as a compound disk having a center disk portion 352, side disk portions 360, 361, and a center opening 370. Center opening 370 extends through center disk portion 352 and side disk portions 360, 361, and is sized to receive shaft 205 of developer roll 206. Center disk portion 352 has an outer circumferential surface 353 and opposite axial faces 355, 356. Side disk portions 360, 361 extend from opposite axial faces 355, 356 of center disk portion 352. Each side disk portion 360, 361 has a corresponding outer circumferential surface 363, 364 and has a smaller diameter relative to a diameter of center disk portion 352.

Separator member 300 includes a body 302 having an open end 303 that allows separator member 300 to rotatably mount about rotational axis 207 by snap-fit engagement to spacer 350. In the embodiment illustrated, separator member 300 includes a first retaining ring 305 and a second retaining ring 306 each having an arcuate profile and a respective center opening 308, 309. First and second retaining rings 305, 306 are deflectable to facilitate installation and retention of body 302 on a corresponding spacer 350. In the embodiment illustrated, each center opening 308, 309 of retaining rings 305, 306 is sized to provide a clearance fit with a corresponding outer circumferential surface 363, 364 of a corresponding side disk portion 360, 361 of spacer 350 such that retaining rings 305, 306 can be elastically deformed and snapped into place via open end 303 of body 302 when installed on spacer 350 and so that, after installation, outer circumferential surfaces 363, 364 of side disk portions 360, 361 of spacer 350 provide bearing surfaces against which separator member 300 may rotate.

First and second retaining rings 305, 306 are spaced from each other by a gap 311. In the embodiment illustrated, gap 311 is sized to receive an axial width of center disk portion 352 of spacer 350. Retaining rings 305, 306 are connected to each other by a first pair of opposed extension arms 315 linked to each other by a first bridge arm 317 and a second pair of opposed extension arms 345 linked to each other by a second bridge arm 347. First pair of opposed extension arms 315 and second pair of opposed extension arms 345 extend radially outward from corresponding retaining rings 305, 306 of separator member 300 such that clearance openings 319, 349 are formed at the central portions of first and second bridge arms 317, 347 for receiving center disk portion 352 of spacer 350. When separator member 300 is snapped into place on spacer 350, the clearance fit between center openings 308, 309 of retaining rings 305, 306 and corresponding side disk portions 360, 361 of spacer 350 permits rotation of separator member 300 about spacer 350 while any contact between center disk portion 352 of spacer 350 and first and second pair of opposed extension arms 315, 345 prevents axial movement of separator member 300 relative to spacer 350.

In the example embodiment illustrated, separator member 300 includes a resilient arm 325 projecting from first bridge arm 317. First bridge arm 317, together with resilient arm 325, form an engagement surface 319 for contacting outer surface 404 of PC drum 402 when separator member 300 is in the engaged position and when separator member 300 rotates in a direction toward the disengaged position from the engaged position, as discussed below. In the embodiment illustrated, the radial position of first bridge arm 317 and resilient arm 325 relative to rotational axis 207 of developer roll 206 is greater than a radius of developer roll 206 such that engagement surface 319 is radially beyond outer surface 208 of developer roll 206 when separator member 300 is installed on spacer 350. The profile of first bridge arm 317 is shaped to securely engage PC drum 402 when separator member 300 is in the engaged position. In the embodiment illustrated, first bridge arm 317 includes an uneven surface having a first segment 321 and a second segment 322 that is recessed relative to first segment 321. At least a portion of first segment 321 and at least a portion of second segment 322 are configured to contact outer surface 404 of PC drum 402 when separator member 300 is in the engaged position.

In one embodiment, first segment 321 is dimensioned to help prevent separator member 300 from being rotated past the engaged position when separator member 300 is engaged with PC drum 402 while second segment 322 is dimensioned to facilitate disengagement of PC drum 402 from separator member 300 when separator member 300 is rotated away from the engaged position towards the disengaged position.

In the embodiment illustrated, resilient arm 325 extends in a cantilevered manner from first bridge arm 317 at an angle relative to first pair of opposed extension arms 315 with a free end 327 extending towards second bridge arm 347. Resilient arm 325 is deflectable by PC drum 402 towards spacer 350 when outer surface 404 of PC drum 402 contacts resilient arm 325. In one embodiment, resilient arm 325 applies a dynamic reaction force to PC drum 402 that varies depending on the angular position of separator member 300 and the line of contact between outer surface 404 of PC drum 402 and resilient arm 325 in order to allow a steady decrease in the separation distance between outer surface 404 of PC drum 402 and outer surface 208 of developer roll 206 as separator member 300 rotates from the engaged position towards the disengaged position until outer surface 404 of PC drum 402 contacts outer surface 208 of developer roll 206. For example, resilient arm 325 is dimensioned to allow contact between separator member 300 and outer surface 404 of PC drum 402 at various points along resilient arm 325 that result in greater separation distance at areas closer to first bridge arm 317 and smaller separation distance at areas closer to free end 327 of resilient arm due to increasing deflection of resilient arm 325 as contact between outer surface 404 of PC drum 402 and resilient arm 325 moves away from first bridge arm 317 and closer to free end 327 of resilient arm 325, as discussed further below.

In one example embodiment, separator member 300 is molded as a single unit from a thermoplastic material, such as polyoxymethylene (POM). In other embodiments, separator member 300 may be made of any suitable material, or combination of materials (e.g., a plastic material having a rubber pad attached thereto), that provides desired stiffness and resiliency to allow separator member 300 to be elastically clipped onto spacer 350.

Figure 7A:
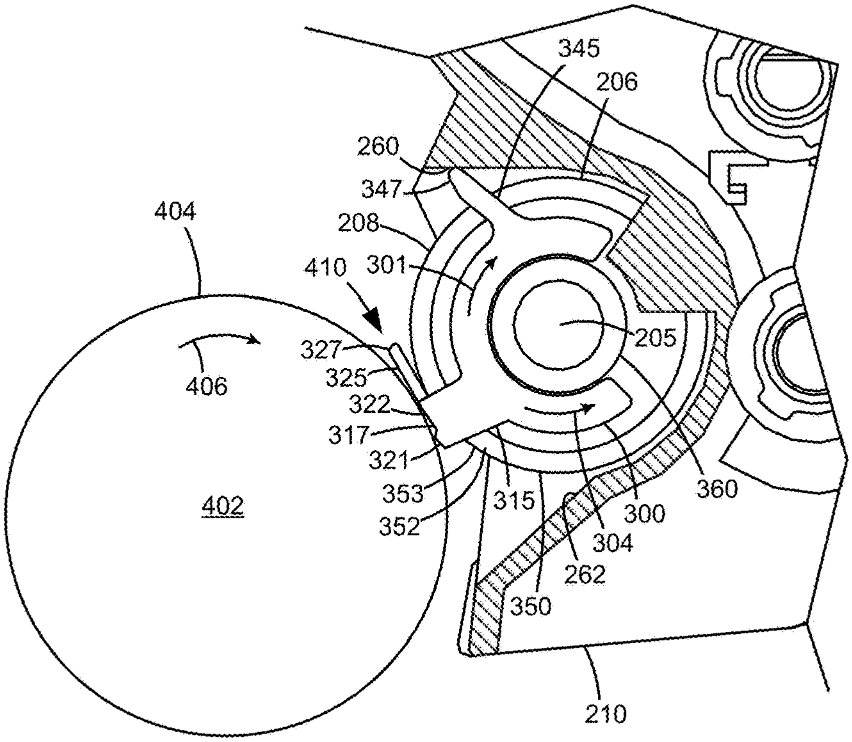
FIGS. 7A-7C are sequential side elevation views depicting operation of the separator member in FIGS. 5A and 5B according to one example embodiment.
Figure 7B:
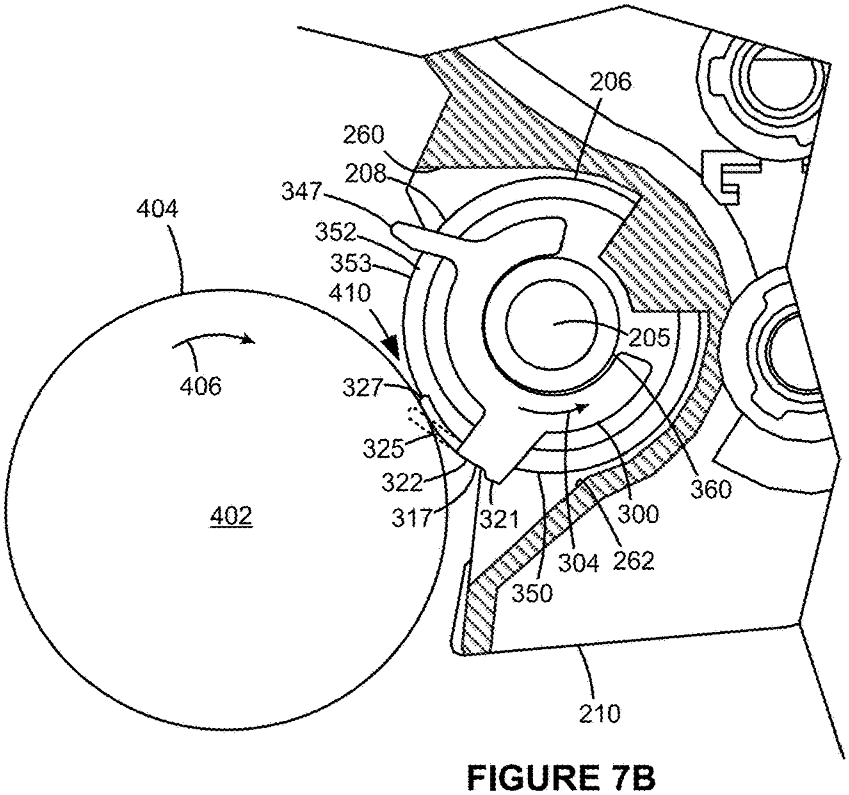
Figure 7C:
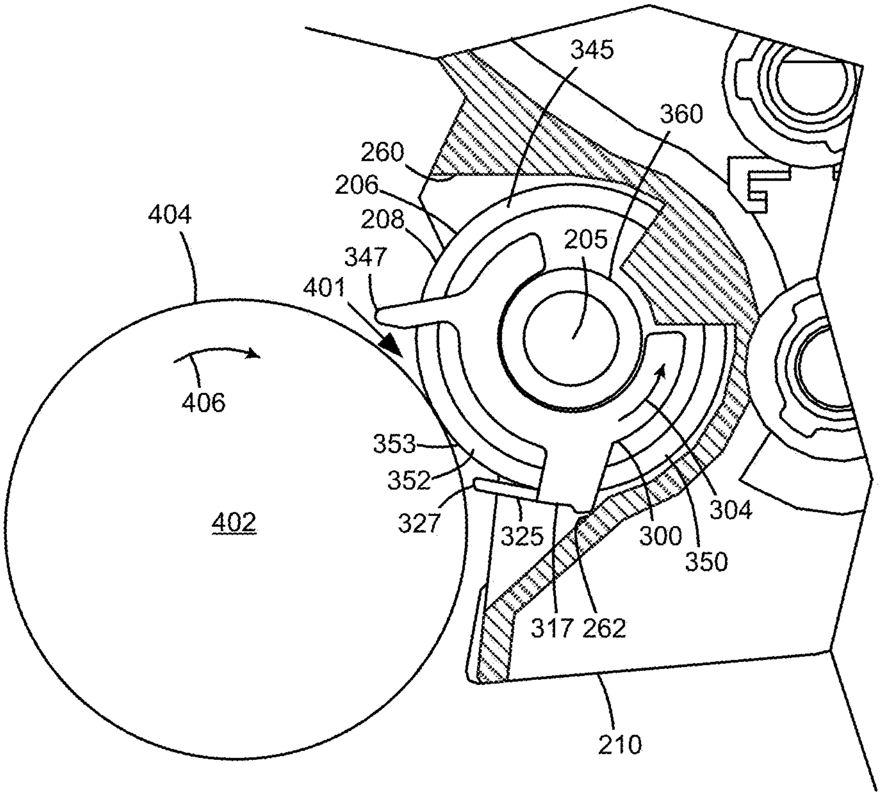

FIGS. 7A-7C are sequential side elevation views of developer unit 200 depicting operation of separator member 300 relative to developer roll 206 and PC drum 402. Because both separator members 300A, 300B operate in the same manner, only one separator member 300 is shown in FIGS. 7A-7C. Separator member 300 is rotatable about rotational axis 207 between a first angular position shown in FIG. 7A corresponding to the engaged position shown in FIG. 5A and a second angular position shown in FIG. 7C corresponding to the disengaged position shown in FIG. 5B. In the example embodiment illustrated, outer circumferential surface 353 of center disk portion 352 of spacer 350 is substantially radially aligned with outer surface 208 of developer roll 206. In other embodiments, however, the outer circumferential surface 353 of center disk portion 352 of spacer 350 may have a slight radial gap relative to outer surface 208 of developer roll 206. Separator member 300 may be installed on (and/or removed from) spacer 350 by direct user contact, such as by using fingers, or indirect contact using a handheld tool. In one embodiment, developer roll 206 is spring-biased, directly or indirectly, towards PC drum 402. For example, the developer roll assembly may be spring-biased towards PC drum 402 or body 210 of developer unit 200 may be spring-biased towards PC drum 402.

In FIG. 7A, separator member 300 is rotatably positioned on spacer 350 such that first bridge arm 317 contacts outer surface 404 of PC drum 402 causing outer surface 404 of PC drum 402 and outer surface 208 of developer roll 206 to be spaced apart from each other by a gap 410. In the embodiment illustrated, first pair of opposed extension arms 315 and first bridge arm 317 are substantially undeformed and resilient arm 325 is in an undeflected state when separator member 300 is in the engaged position. A first stop 260 is positioned along a rotational path of second bridge arm 347 for limiting the rotation of separator member 300 about shaft 205 in rotational direction 301. In the embodiment illustrated, first stop 260 is shown as an abutment surface on body 210 of developer unit 200.

Frictional resistance and the biasing force between first bridge arm 317 of separator member 300 and outer surface 404 of PC drum 402 prevents separator member 300 from rotating freely about shaft 205 of developer roll 206 thereby holding separator member 300 in the engaged position when PC drum 402 is stationary. In the embodiment illustrated, first bridge arm 317 is in bilateral contact with PC drum 402 in which first bridge arm 317 of separator member 300 exerts reaction forces against outer surface 404 of PC drum 402 along two distinct (e.g., parallel) lines or axes at the contact points for added stability. It will be appreciated, however, that first bridge arm 317 of separator member 300 may be shaped to allow contact with outer surface 404 of PC drum 402 along one or more lines, axes, and/or planes when in the engaged position in other embodiments. In the embodiment illustrated, developer roll 206 moves away from PC drum 402 to form gap 410 as separator member 300 overcomes the biasing force on developer roll 206 when separator member 300 is rotated to the engaged position.

When PC drum 402 initially rotates in operative rotational direction 406 while separator member 300 is in the engaged position, frictional contact between outer surface 404 of PC drum 402 and first bridge arm 317 of separator member 300 causes PC drum 402 to drive separator member 300 to rotate in rotational direction 304 as shown in FIG. 7B. In this embodiment, contact between outer surface 404 of PC drum 402 and separator member 300 transitions from first bridge arm 317 to resilient arm 325 of separator member 300 after initial rotation of PC drum 402 from the engaged position shown in FIG. 7A. As PC drum 402 further rotates in operative rotational direction 406, which further rotates separator member 300 in rotational direction 304, contact between PC drum 402 and separator member 300 travels along resilient arm 325 of separator member 300 towards free end 327. While outer surface 404 of PC drum 402 is in contact with resilient arm 325 of separator member 300, PC drum 402 overcomes the spring force of resilient arm 325 causing resilient arm 325 to be deflected by PC drum 402 towards developer roll 206 thereby allowing developer roll 206 to move closer to PC drum 402 and reducing gap 410 between outer surface 404 of PC drum 402 and outer surface 208 of developer roll 206. For purposes of illustration, the undeflected state of resilient arm 325 is shown by phantom lines in FIG. 7B.

As contact between outer surface 404 of PC drum 402 and resilient arm 325 moves closer to free end 327 of resilient arm 325 as PC drum 402 further rotates in operative rotational direction 406, which causes separator member 300 to also rotate further in rotational direction 304, the amount of deflection of resilient arm 325 towards developer roll 206 increases causing developer roll 206 to move closer to PC drum 402 until PC drum 402 moves past free end 327 of resilient arm 325 at which point resilient arm 325 disengages from outer surface 404 of PC drum 402 allowing outer surface 208 of developer roll 206 to contact outer surface 404 of PC drum 402 as shown in FIG. 7C. Upon disengaging from PC drum 402, separator member 300 freely rotates in rotational direction 304 under its own weight until first bridge arm 317 contacts a second stop 262 positioned along a rotational path of first bridge arm 317, which stops the rotational advance of separator member 300 in rotational direction 304. In the embodiment illustrated, second stop 262 is shown as an abutment surface on body 210 of developer unit 200. In this embodiment, first pair of opposed extension arms 315, first bridge arm 317, and resilient arm 325 together function as a separator arm for separating PC drum 402 and developer roll 206, and as a lever arm for limiting rotational movement of separator member 300 in rotational direction 304.

With separator member 300 in the disengaged position shown in FIG. 7C, outer surface 404 of PC drum 402 and outer surface 208 of developer roll 206 form nip 401 with each other. In this position, outer surface 404 of PC drum 402 and outer surface 208 of developer roll 206 may be tangentially touching each other (e.g., when the outer circumferential surface 353 of center disk portion 352 of spacer 350 is radially aligned with the outer surface 208 of developer roll 206, which allows the outer circumferential surface 353 of center disk portion 352 of spacer 350 to contact outer surface 404 of PC drum 402 just as outer surface 208 of developer roll 206 contacts outer surface 404 of PC drum 402), or an interference fit may be formed between outer surface 404 of PC drum 402 and outer surface 208 of developer roll 206 (e.g., when a radial gap exists between the outer circumferential surface 353 of center disk portion 352 of spacer 350 and outer surface 208 of developer roll 206, such as when the radius of developer roll 206 is slightly greater than the radius of center disk portion 352 of spacer 350, which allows outer surface 208 of developer roll 206 to be pressed into contact with outer surface 404 of PC drum 402 before center disk portion 352 of spacer 350 contacts PC drum 402).

If desired, separator member 300 may be rotated from the disengaged position back to the engaged position, such as manually by a user or by using a handheld tool, such as by engaging extension arms 345 and/or second bridge arm 347, which may be configured to permit easy access for a handheld tool to rotate separator member 300 from the disengaged position to the engaged position. For example, with separator member 300 installed on spacer 350 in the engaged position, separator member 300 may rotate from the engaged position to the disengaged position when a manufacturer performs test prints with image forming device 20. After testing, the manufacturer may return separator member 300 to the engaged position by rotating separator member 300 in rotational direction 301 prior to shipping image forming device 20. In this manner, image forming device 20 may be shipped or transported with developer roll 206 and PC drum 402 separated from each other in order to avoid potential print defects resulting from prolonged contact between outer surface 208 of developer roll 206 and outer surface 404 of PC drum 402.

While the example embodiments illustrated above show separator member 300 positioned on spacer 350, it will be appreciated that separator member 300 may be arranged in other positions as desired. For example, in one embodiment, separator member 300 may be mounted on a boss or bushing disposed on first and second end frames 250A. 250B. In another embodiment, separator member 300 may be directly mounted to shaft 205 without a spacer, such as by filling the inner diameter (and/or the gap between retaining rings 305, 306) of separator member 300 with material that wraps around shaft 205. Further, in the example embodiment discussed above, separator members 300 are configured to separate developer roll 206 and PC drum 402. However, in other embodiments, separator members 300 may be employed to separate other rolls forming a nip. For example, a first roll and a second roll may be rotatably mounted and disposed relative to each other so that the outer surfaces of the rolls contact each other during operation. At least one of the rolls may be movable relative to each other so that the first roll and the second roll may be separated at least temporarily by separator members 300.

Further, although the example image forming device 20 discussed above includes four toner cartridges 100 and corresponding developer units 200 and PC units 400, more or fewer replaceable units may be used depending on the color options needed. For example, in one embodiment, the image forming device includes a single toner cartridge and corresponding developer unit and PC unit in order to permit monochrome printing.

The foregoing description illustrates various aspects of the present disclosure. It is not intended to be exhaustive. Rather, it is chosen to illustrate the principles of the present disclosure and its practical application to enable one of ordinary skill in the art to utilize the present disclosure, including its various modifications that naturally follow. All modifications and variations are contemplated within the scope of the present disclosure as determined by the appended claims. Relatively apparent modifications include combining one or more features of various embodiments with features of other embodiments.

The invention claimed is:

1. A nip separator for use in an image forming device, comprising:

a retainer configured to retain the nip separator on a first rotatable component of the image forming device during operation of the image forming device with the nip separator rotatable about a rotational axis of the first rotatable component independent of the first rotatable component, the nip separator is manually installable on the first rotatable component; and an arm extending from the retainer to contact a second rotatable component of the image forming device to maintain separation between surfaces of the first rotatable component and the second rotatable component when the nip separator is in an engaged position, the nip separator is rotatable about the rotational axis of the first rotatable component from the engaged position to a disengaged position by contact between the arm and the second rotatable component upon rotation of the second rotatable component in an operative rotational direction of the second rotatable component to permit continued operative contact between the surfaces of the first rotatable component and the second rotatable component when the nip separator is in the disengaged position.

2. The nip separator of claim 1, wherein the nip separator is manually installable on the first rotatable component by snap-fit engagement.

3. The nip separator of claim 1, wherein the arm includes a first portion and a second portion extending from the first portion, the first portion of the arm for contacting the second rotatable component when the nip separator is in the engaged position, the second portion of the arm for contacting the second rotatable component when the nip separator rotates from the engaged position towards the disengaged position.

4. The nip separator of claim 3, wherein the second portion of the arm is deflectable towards the rotational axis of the first rotatable component by contact between the second portion of the arm and the second rotatable component when the nip separator rotates from the engaged position towards the disengaged position.

5. The nip separator of claim 3, wherein the second portion of the arm extends from the first portion of the arm in a cantilevered manner.

6. The nip separator of claim 1, wherein the retainer is configured to retain the nip separator on a spacer ring positioned at an end portion of the first rotatable component during operation of the image forming device.

7. The nip separator of claim 1, wherein the retainer includes a retaining ring having an arcuate profile.

8. A nip separator for use in an image forming device, comprising:

a retaining ring for retaining the nip separator on a first rotatable component of the image forming device during operation of the image forming device with the nip separator rotatable about a rotational axis of the first rotatable component independent of the first rotatable component;

an arm having a first portion extending radially relative to the rotational axis of the first rotatable component from the retaining ring, a deflectable second portion of the arm extends from a distal end of the first portion of the arm at an angle to the first portion of the arm; and a contact surface formed by the first and second portions of the arm to contact a second rotatable component of the image forming device to maintain separation between an outer surface of the first rotatable component and an outer surface of the second rotatable component when the nip separator is in an engaged position, the nip separator is rotatable relative to the rotational axis of the first rotatable component from the engaged position to a disengaged position by contact between the contact surface of the arm and the outer surface of the second rotatable component upon rotation of the second rotatable component in an operative rotational direction of the second rotatable component to permit continued contact between the outer surface of the first rotatable component and the outer surface of the second rotatable component when the nip separator is in the disengaged position, deflection of the second portion of the arm toward the rotational axis of the first rotatable component permits a gap between the outer surface of the first rotatable component and the outer surface of the second rotatable component to decrease during rotation of the nip separator from the engaged position to the disengaged position.

9. The nip separator of claim 8, wherein the retaining ring includes an arcuate profile having an open end such that the nip separator is manually installable on the first rotatable component by snap-fit engagement.

10. The nip separator of claim 8, wherein the second portion of the arm extends from the distal end of the first portion of the arm in a cantilevered manner.

11. The nip separator of claim 8, wherein the contact surface formed by the first portion of the arm includes a first segment and a second segment that is recessed relative to the first segment.

12. The nip separator of claim 11, wherein the second portion of the arm extends from the second segment of the contact surface formed by the first portion of the arm.

13. The nip separator of claim 8, wherein the retaining ring is configured to retain the nip separator on a spacer ring positioned at an end portion of the first rotatable component during operation of the image forming device.

14. An assembly for an image forming device, comprising:

a first rotatable component;

a second rotatable component; and a first separator positioned at a first end portion of the first rotatable component and a second separator positioned at a second end portion of the first rotatable component, each of the first separator and the second separator being manually installable onto and detachable from the first rotatable component, each of the first separator and the second separator being movable relative to the first and second rotatable components between an engaged position and a disengaged position, in the engaged position, the first and second separators separate surfaces of the first rotatable component and the second rotatable component, the first and second separators are movable from the engaged position to the disengaged position upon rotation of the second rotatable component in an operative rotational direction of the second rotatable component by contact between the first and second separators and the second rotational component permitting continued operative contact between the surfaces of the first rotatable component and the second rotatable component when the nip separator is in the disengaged position.

15. The assembly of claim 14, wherein the first and second separators are manually installable onto and detachable from the first rotatable component by snap-fit engagement and disengagement.

16. The assembly of claim 14, wherein the first end portion of the first rotatable component includes a first spacer ring and the second end portion of the first rotatable component includes a second spacer ring, the first separator is positioned on the first spacer ring and the second separator is positioned on the second spacer ring.

17. The assembly of claim 16, wherein the first and second separators are rotatable about the first and second spacer rings independent of the first and second spacer rings, respectively.

18. The assembly of claim 16, wherein in the engaged position, the first and second separators separate surfaces of the spacer ring and the second rotatable component.

19. The assembly of claim 14, wherein the first rotatable component includes a developer roll and the second rotatable component includes a photoconductive drum.

* * * * *